United States Patent
Kraus

(10) Patent No.: US 7,682,073 B2
(45) Date of Patent: Mar. 23, 2010

(54) RADIATION MEASURING APPARATUS, AND METHOD AND DEVICE FOR TESTING PROPER FUNCTIONING OF SAID RADIATION MEASURING APPARATUS

(75) Inventor: Bernhard Kraus, Braunfels (DE)

(73) Assignee: Kaz, Incorporated, New York, NY (US)

( * ) Notice: Subject to any disclaimer, the term of this patent is extended or adjusted under 35 U.S.C. 154(b) by 112 days.

(21) Appl. No.: 11/575,279

(22) PCT Filed: Aug. 25, 2005

(86) PCT No.: PCT/EP2005/009166

§ 371 (c)(1),
(2), (4) Date: Aug. 14, 2007

(87) PCT Pub. No.: WO2006/029694

PCT Pub. Date: Mar. 23, 2006

(65) Prior Publication Data

US 2008/0019415 A1    Jan. 24, 2008

(30) Foreign Application Priority Data

Sep. 18, 2004  (DE) .................. 10 2004 045 444
Oct. 16, 2004  (DE) .................. 10 2004 050 451

(51) Int. Cl.
*G01J 5/00* (2006.01)
*G01K 15/00* (2006.01)

(52) U.S. Cl. .................... 374/132; 374/121; 374/1; 600/474

(58) Field of Classification Search ............ 374/121, 374/132, 1; 600/474
See application file for complete search history.

(56) References Cited

U.S. PATENT DOCUMENTS

2003/0060717 A1    3/2003    Kraus et al.
2004/0086022 A1    5/2004    Kraus et al.

FOREIGN PATENT DOCUMENTS

DE    19757448    7/1999

OTHER PUBLICATIONS

PCT International Search Report for International Application No. PCT/EP2005/009166, Dated Dec. 12, 2005.

*Primary Examiner*—Gail Verbitsky
*Assistant Examiner*—Mirellys Jagan
(74) *Attorney, Agent, or Firm*—Stroock & Stroock & Lavan LLP

(57) ABSTRACT

A conventional radiation thermometer encompasses an infrared radiation sensor and a heatable and/or coolable radiation incidence window. The method and radiation thermometer according to the invention use the established dependence of the sensor signal U of the infrared radiation sensor on the temperature $T_w$ of the radiation incidence window W (or any other heatable or coolable optical element in the beam path) for verifying its proper functional operation. Applying the method according to the invention, the radiation incidence window (or perhaps another optical element in the beam path) is heated up or cooled by activating an associated electric heating or cooling device. The resulting change $\Delta U_w$ in the sensor signal U is detected, preferably in continuous fashion, as a function of the window temperature $T_w$ and analyzed or verified for any deviation from an acceptable value or permissible range.

14 Claims, 1 Drawing Sheet

RADIATION MEASURING APPARATUS, AND METHOD AND DEVICE FOR TESTING PROPER FUNCTIONING OF SAID RADIATION MEASURING APPARATUS

CROSS-REFERENCE TO PRIOR APPLICATION

This is a U.S. National Phase application under 35 U.S.C. §371 of International Application No. PCT/EP2005/009166, filed Aug. 25, 2005, and claims the benefit of German Patent Application Nos. 10200404544.2, filed on Sep. 18, 2004 and 102004050451.2, filed on Oct. 16, 2004, all of which are incorporated herein. The International Application was published in German on Mar. 23, 2006 as WO2006/029694 A1 under PCT Article 21(2).

FIELD OF THE INVENTION

This invention relates to a radiation measuring apparatus with a heatable or coolable optical element in the beam path, for instance an infrared fever thermometer with a heatable and/or coolable radiation incidence window, as well as to a method and a device for verifying the proper functional operation of this type of radiation measuring apparatus.

BACKGROUND OF THE INVENTION

Infrared-radiation thermometers used in professional applications as in the case of infrared fever thermometers at hospitals require periodic functional testing to permit timely detection of undesirable contamination or possible calibration errors and correspondingly incorrect measuring results. For that purpose, hospitals typically install a black body radiator of a known temperature to serve as the radiation reference point. Such radiators, however, are relatively expensive and their operation is awkward insofar as it is necessary for each routinely required functional test to transport the infrared fever thermometers back and forth between the station concerned and the radiation reference point.

WO 00/54012 describes an infrared sensor consisting of a sensor enclosure with an infrared-transmissive radiation incidence window, a detector element housed in the sensor enclosure serving to convert the incident infrared radiation into electrical measuring signals, and associated measuring electronics for capturing and evaluating the measuring signals. Outside the beam path, the sensor enclosure also incorporates an activable infrared radiator so positioned that at least part of the energy emitted by it passes through the radiation incidence window, heating up any contaminants that might be present on it. The detector element captures the temperature gradient and converts it into a calibration signal, which then serves as a measure of the contamination of the window and is used in the automatic compensation for the contaminating effect in a subsequent temperature measurement.

SUMMARY OF THE INVENTION

It is the objective of this invention to introduce as simple as possible a radiation measuring apparatus whose proper functioning can be tested quickly, as well as an effective, reliable method for testing the radiation measuring apparatus for any possible contamination or calibration errors that might be conducive to erroneous measurements. The object method should also enable the user to rectify the problem if a malfunction is detected.

According to the invention this objective is achieved by employing a method as specified in claim 1. Preferred procedural variations are described in the related sub-claims.

A conventional radiation thermometer encompasses an infrared radiation sensor and a heatable and/or coolable radiation incidence window. The method and radiation thermometer according to the invention use the established dependence of the sensor signal U of the infrared radiation sensor on the temperature $T_w$ of the radiation incidence window W (or any other heatable or coolable optical element in the beam path) for verifying its proper functional operation. In the case of an ideal test object having an emissivity of 1 and a temperature $T_b$ as well as a radiation incidence window having an emissivity of $\epsilon$ and a transmissivity t, the result for the sensor signal U, when applying Planck's radiation integral L(T) and on the assumption that the sensor temperature is equal to the ambient temperature $T_a$, will be as follows:

$$U = S' \cdot [t \cdot (L(T_b) - L(T_a)) + \varepsilon \cdot (L(T_w) - L(T_a))] \quad (1)$$

or $$U = S \cdot \left[ (L(T_b) - L(T_a)) + \frac{\varepsilon}{t} \cdot (L(T_w) - L(T_a)) \right] \quad (2)$$

The sensitivity S of the radiation sensor as well as the emissivity $\epsilon$ and the transmissivity t of the radiation incidence window W are determined as equipment-specific parameters during the calibration of the radiation thermometer and are stored as calibration data in the associated measuring electronics. Any possible change of one or more of these parameters for instance due to contamination, aging or a defective sensor element in the beam path will trigger a corresponding change or corruption of the sensor signal U and thus result in corresponding measuring errors.

When the radiation incidence window W is neither heated nor cooled, the window temperature $T_w$ will be identical to the ambient temperature $T_a$, in which case the radiation incidence window W has no bearing on the sensor signal U, and the sensor signal is only determined by the sensitivity S of the radiation sensor, the temperature $T_b$ of the test object selected and the ambient temperature $T_a$:

$$U_0 = S \cdot [L(T_b) - L(T_a)] \quad (3)$$

However, if the radiation incidence window W (or any other optical element in the beam path) is either heated or cooled, the sensor signal U will increase or decrease from its window-independent value $U_0$ as a function of the three equipment-specific parameters S, $\epsilon$ and t, i.e. of the window temperature $T_w$ and the ambient temperature $T_a$ by the following amount:

$$\Delta U_W = \left| S \cdot \frac{\varepsilon}{t} \cdot [L(T_W) - L(T_a)] \right| \quad (4)$$

Accordingly, $\Delta U_w$ increases from a zero value for $T_w = T_a$ as the radiation incidence window W heats up or cools off, the functional dependence being determined by Planck's radiation integral $L(T_w)$ with a proportionality constant of $S \cdot \epsilon / t$.

Applying the method according to the invention, the radiation incidence window (or perhaps another optical element in the beam path) is heated up or cooled by activating an associated electric heating or cooling device. The resulting change $\Delta U_w$ in the sensor signal U is detected, preferably in continuous fashion, as a function of the window temperature $T_w$ and analyzed or verified for any deviation from an acceptable value or permissible range established on the basis of the calibration data and in the calibration process of the radiation measuring apparatus, making allowance for certain acceptable tolerance or error limits that still ensure proper functioning of the radiation measuring apparatus. In the event of an unacceptably significant deviation the user receives a signal indicating a malfunction.

Thus, for instance in the case of at least any two different temperatures $T_{w1}$ and $T_{w2}$ of the radiation incidence window W, the radiation measuring apparatus will register a measuring signal $U_1$ or $U_2$ representing the temperature $T_b$ of a given test object. The measurements are taken at short intervals, allowing for a sufficiently accurate assumption of a constant object temperature $T_b$ and ambient temperature $T_a$ during the measuring process. The differential value $\Delta U$ between the two measuring signals $U_1$ and $U_2$ is thus derived from equation (2):

$$\Delta U = |U_2 - U_1| = \left| S \cdot \frac{\varepsilon}{t} \cdot (L(T_{w2}) - L(T_{w1})) \right| \qquad (5)$$

Without heating or cooling, the window temperature $T_w$ will be constant so that for $T_{w1}=T_{w2}=T_w$ the differential signal $\Delta U$ will be zero and, as mentioned above, $T_w=T_a$ will not cause the radiation incidence window to influence the sensor signal U (meaning $\Delta U=\Delta U_w=0$).

In the case of different window temperatures $T_{w1}$ and $T_{w2}$ or, in general, of a change $\Delta U_w$ of the sensor signal U as a function of the window temperature $T_w$ (or the rise of the corresponding sensor signal curve), the differential signal $\Delta U$ will be merely a function of these two window temperatures $T_{w1}$ and $T_{w2}$ (or in general of the window temperature $T_w$)—where one of these two temperatures may be selected to represent the ambient temperature $T_a$— and of the three equipment-specific parameters S, $\varepsilon$ and t. It is independent, however, of the unknown temperature $T_b$ of the test object concerned and, unless one of the two measurements is already being performed with an unheated or uncooled radiation incidence window, it is also independent of the unknown ambient temperature $T_a$, so that knowledge of these two extraneous temperature variables and the corresponding Planck's radiation integrals $L(T_b)$ and $L(T_a)$ will not be absolutely necessary for quantifying equation (5).

The specified differential signal $\Delta U$ is thus a variable that can be determined in the calibration of the radiation measuring apparatus as a function of the window temperatures $T_{w1}$ and $T_{w2}$ and stored in the measuring electronics together with the other calibration data S, $\varepsilon$ and t (plus, where appropriate, $L(T_w)$ for different $T_w$).

Following the method according to the invention, the measured signal differential $\Delta U=|U_2-U_1|$ of the two measuring signals $U_1$, $U_2$ will now be compared with the acceptable value or permissible range determined during the calibration, including certain acceptable tolerance or error limits that still ensure the proper functioning of the radiation measuring apparatus. In the event of a possible deviation of the measured signal differential $\Delta U$ from the acceptable value or permissible range, the user will automatically receive a signal indicating a malfunction. Preferably, the measured differential signal $\Delta U$ will at the same time enable the user to determine the nature of the malfunction, perhaps even with an indication of how it can be remedied. Based on the signal differential $\Delta U$, a calibration error that has been detected could even be corrected automatically as explained below. Accordingly, it would thus be possible to achieve not only an automatic compensation for the calibration error detected but also an automatic correction of the measured values in the subsequent utilization of the radiation measuring apparatus for instance when measuring the temperature in the ear of a user.

In the event of a contamination of the radiation incidence window W, the transmissivity t of the latter will be diminished while its emissivity $\varepsilon$ will increase, causing an augmentation of the differential signal $\Delta U$ measured at two selected window temperatures $T_{w1}$ and $T_{w2}$ per equation (5) relative to that of an uncontaminated radiation incidence window. When the radiation incidence window W is heated, the sensor signal U will grow correspondingly stronger or, when the window is cooled, it will decrease more rapidly than in the case of a clean radiation incidence window W.

In the event the measured difference $\Delta U=|U_2-U_1|$ of the two measuring signals $U_1$, $U_2$ amounts to more than the acceptable value or permissible range, a signal will inform the user of an unacceptable degree of contamination of the radiation incidence window W, suggesting that the radiation incidence window W be cleaned. Hence, as a first procedural step in remedying the malfunction, the radiation incidence window W is inspected and cleaned if and as necessary. For reassurance prior to any further use of the radiation measuring apparatus, the next step is preferably another test of the proper functional mode and reliability applying the method described above.

On the other hand, if for instance due to contamination, aging or a defect the sensitivity S of a sensor element in the beam path has decreased, equation (5) will result in a correspondingly smaller signal differential $\Delta U$ than in the original uncompromised state of calibration. Accordingly, a heated radiation incidence window W will cause the sensor signal U to rise less steeply, a cooled window will cause it to drop off more slowly than in the case of a radiation sensor in proper condition.

In the event the measured difference of the two measuring signals $U_1$ and $U_2$ is $\Delta U=|U_2-U_1|$ and thus amounts to less than the acceptable value or permissible range, the user will receive a signal indicating a possible calibration error due to a changed sensor sensitivity S.

In that case, the first step is preferably again an inspection and, if necessary, cleaning of the radiation incidence window W for the reliable elimination of the effects of possible contamination and sufficiently accurate assumption of constant values for $\varepsilon$ and t of the original calibration data stored in the measuring electronics.

This is followed, in the manner described above, by a renewed verification of the proper operation or functionality of the radiation measuring apparatus, with a new determination of the measuring signal differential $\Delta U$ and its deviation from the acceptable value or permissible range (or the deviation of the slope $S \cdot \varepsilon / t$ of the sensor signal curve resulting as a function of the window temperature $T_w$). Since according to equation (5) such deviation is now strictly attributable to a change in the sensitivity S of the radiation sensor, it can be utilized in the automatic compensation for the existing calibration error to permit the subsequent use of the radiation measuring apparatus, for instance, for temperature measurements in the case of an infrared radiation thermometer, and for the automatic correction of the sensor signals or measured values, employing that deviation for the automatic generation of a corresponding signal for calibration correction or sensor-signal or measured-signal correction. It follows that the radiation measuring apparatus could calibrate itself automatically prior to each measurement, thus automatically eliminating the effect of any contamination, aging or defective sensor element in the beam path on the measuring results.

Where practical, the system may even suggest that the user perform a precise recalibration of the radiation measuring apparatus.

To avoid incorrect measurements, the functional test of the radiation measuring apparatus as described above should be performed, applying the method according to the invention, preferably prior to every measurement.

In particular, the test is performed in continuous fashion, with a continuous measurement of the sensor signal U as the radiation incidence window W is heated or cooled, determining the upslope or downslope of the curve of the sensor signal as a function of the window temperature $T_w$. Following the above explanations, the slope can be simply determined for instance based on the difference between two measuring signals. However, if a higher degree of precision is required, correspondingly more accurate numerical processes may be employed in which a larger number of data points are evaluated. The slope, which in accordance with equation (4) is equal to the actual value for $S \cdot \epsilon/t$, is then compared with the original slope determined during the calibration as described above.

The functional test of the radiation measuring apparatus according to the invention may also be performed in quasi-continuous fashion at specific temperature and time intervals.

The continuous or quasi-continuous functional testing of the radiation measuring apparatus is preferably performed even while the radiation measuring apparatus is in use, for instance during a temperature measurement in the case of an infrared radiation thermometer. The temperature $T_w$ of the radiation incidence window (or, as the case may be, of some other optical element in the beam path), is preferably varied periodically, for instance in a sinusoidal mode, thus resulting in a corresponding periodic change of the measured sensor signal U.

To avoid measuring-signal changes due to a possible temperature fluctuation of the test object, the functional test according to the invention can even be performed with an obturated radiation incidence window, leaving only the thermal radiation of the radiation incidence window W to be detected and evaluated in accordance with the method according to the invention.

The novel use of a heated or cooled optical element in the beam path such as, in particular, a suitably designed radiation incidence window, thus permits the quick, very simple, very accurate and very reliable testing of the proper functioning of a radiation measuring apparatus at any time. The method according to the invention makes it possible to reliably identify the nature of a possible malfunction such as contamination or a calibration error due to aging or to a defect and, where applicable, even to automatically remedy the identified malfunction by generating an appropriate signal correcting the malfunction or calibration error. The method described also permits continuous functional monitoring of a radiation-based measuring instrument while in use without noticeably interfering with its manipulation or affecting its measuring accuracy as for instance during a temperature measurement.

In contrast to prior art, the functional testing of a radiation measuring apparatus according to the invention does not require any additional external components such as a blackbody radiator of a known temperature as the radiation reference, thus obviating the need for any particular additional expertise in their proper use while also avoiding the added cost of their acquisition and maintenance. Applying the method according to the invention merely requires an appropriately configured radiation measuring apparatus, which can even be obtained by a simple, cost-effective, essentially software-based conversion according to the invention, or the upgrading of a conventional radiation measuring apparatus such as in particular an IR radiation thermometer with a heatable measuring tip.

The method described thus lends itself particularly well to the automatic functional testing of IR radiation thermometers, permitting in private as well as in industrial utilization not only the very simple and quick detection of contaminated non-reusable protective caps but also ensuring, where appropriate, the reliable detection and automatic correction of calibration errors.

A radiation measuring apparatus for the implementation of the method according to the invention incorporates a sensor enclosure with a transmissive radiation incidence window and an associated heating or cooling device that can preferably be activated in periodic fashion. The sensor enclosure houses at least one infrared sensor element serving to convert incident thermal radiation into electrical signals and connecting to an associated measuring electronics unit for the capture and evaluation of these measuring signals. The measuring electronics unit in turn connects to a suitable display device that displays the measuring signals in a practical manner. Indeed, the display device may incorporate a suitable acquisition or storage capability for the acquisition or storage of the measuring or sensor signals.

The measuring electronics unit encompasses a data memory module for calibration data such as especially the sensitivity S of the radiation sensor as well as the emissivity $\epsilon$ and the transmissivity t of the radiation incidence window W. The calibration data may also include the corresponding signal differentials $\Delta U$ as a function of particular setpoint window temperatures $T_w$, or, alternatively, values for the corresponding Planck's radiation integral $L(T_w)$.

In addition, according to the invention, the measuring electronics unit encompasses an analytical unit for the analysis or evaluation of a temporally varying measuring or sensor signal U and/or of measuring or sensor-signal differentials $\Delta U$ as well as for the generation of a particular malfunction signal that serves to identify a detected malfunction and can be, or is, displayed. The malfunction or analytical signal may also include for instance a calibration, compensation or correction signal for a recalibration of the radiation measuring apparatus or for the automatic correction of measuring signals or measured values.

The radiation incidence window W preferably encompasses at least one temperature probe or temperature sensor for the direct detection of the window temperature $T_w$, as well as an integrated heating or cooling device. For example, the radiation incidence window may be in the form of a sufficiently thin silicon disk provided with an electric heating device. In this case the current flow can be optimized by an appropriate configuration of the silicon disk. At the same time it is possible to integrate one or several temperature sensors in essentially conventional fashion. A silicon disk of that type has a small thermal time constant, permitting a quick change or adaptation of the window temperature in the case of a temporally varied activation of the heating or cooling device.

Preferably the system is additionally equipped with a control device for controlling the acquisition or measuring processes and for controlling the functional tests according to the invention.

In the case of an infrared aural thermometer with a heatable measuring tip, the method according to the invention does not require any additional ancillaries or components. A software upgrade of the measuring electronics as defined above for the analytical unit will suffice. This makes it possible without any additional hardware to reliably detect possible malfunctions, ensuring consistently high measuring accuracy. If the aural thermometer is to be used with a disposable protective cap on the measuring tip, it will be necessary for the calibration data to accommodate not only the optical properties of the radiation incidence window of the aural thermometer but also the emissivity and transmissivity of the disposable, non-reusable protective cap mounted on the measuring tip. However, a recalibration will be required every time the aural thermometer was first used without the protective cap mounted on it and is then to be used with a mounted disposable protective cap, and vice versa. The method according to the invention permits such recalibration to take place automatically. Alternatively, instead of an automatic functional test that is activated every time the radiation thermometer is switched on, an additional switch may be provided by means of which the functional test can be manually activated only when needed. This also applies in situations where the aural thermometer is to be used with different disposable protective caps that may differ in color, shape and/or material.

DESCRIPTION OF THE DRAWINGS

Other features and advantages of this invention will be evident not only from the corresponding patent claims—separately and/or in combination—but also from the following description of a preferred implementation example with reference to the schematic illustrations in the attached figures:

DETAILED DESCRIPTION OF THE INVENTION

Figure 1:
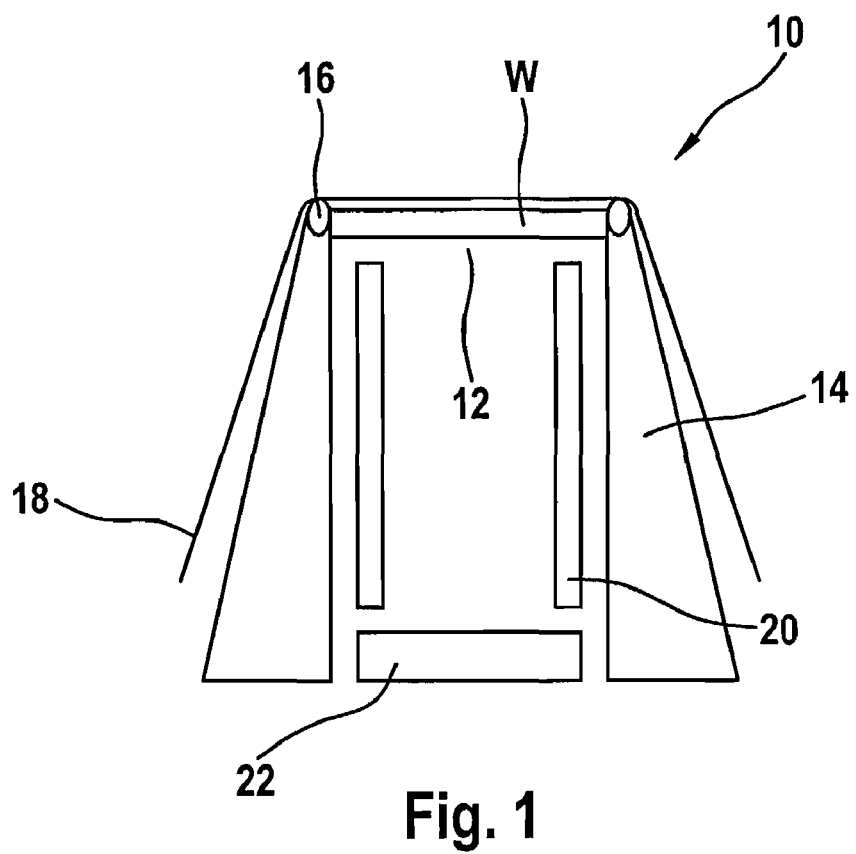
FIG. 1 depicts a heatable measuring tip of an IR radiation thermometer.

The measuring tip 10 illustrated in FIG. 1 encompasses an enclosure 14 conically tapered toward the radiation incidence aperture 12 and designed to permit introduction in the auditory canal of a user for performing a temperature measurement. For protection of the interior of the enclosure against undesirable contamination and possible damage the radiation incidence aperture 12 is closed off by a radiation incidence window W. The latter consists for instance of a thin silicon disk with integrated electrical heating traces and an integrated temperature sensor, connected to a control unit (not illustrated). The temperature sensor is also electrically connected to a measuring electronics unit (not illustrated) serving to capture and evaluate the temperature signals. Where the heating traces and/or the temperature sensor are not integrated into the radiation incidence window W, the latter may be surrounded by a peripheral heatable ring 16 that doubles as a temperature sensor.

The radiation incidence window W is covered by a disposable, replaceable protective cap 18 consisting of a thin polyethylene foil serving to avoid possible contamination of or damage to the radiation incidence window W and in particular to prevent the transmission of diseases due to inadequate or improper cleaning. The disposable protective cap 18 is so shaped and dimensioned that for a temperature measurement it can be inserted in the auditory canal of a person together with the measuring tip 10 without any major disagreeable pressure on the ear.

When heated, the radiation incidence window W emits a correspondingly incremental infrared radiation that is overlaid on the impinging infrared radiation of a given test object (not illustrated). It follows that the section of the disposable protective cap 18 that extends in the beam path is heated through the radiation incidence window W, thereby causing the additional modulation of the measuring signals by the transmissivity and emissivity of the disposable protective cap 18. Significantly, a corresponding change of the measuring or sensor signals will also reflect any possible cerumen contamination of the disposable cap 18.

To avoid signal changes due to possible changes of a detected test object it will be helpful to cover the measuring tip 10 before performing a functional test according to the invention.

Located behind the radiation incidence window W is a waveguide 20 that conducts incident infrared radiation to a downstream infrared sensor 22 serving to collect the infrared radiation and to generate electrical sensor signals U as a function of the radiation collected. There are other design versions without a waveguide.

The infrared sensor 22 on its part connects to the measuring electronics of the IR radiation thermometer designed to convert incoming electrical measuring signals U of the infrared sensor 22 into corresponding temperature signals or temperature values.

The measuring electronics unit in turn connects to a display device (not illustrated), for instance a display screen, permitting the readout of the measured temperature values.

Included in the measuring electronics is a data memory module for storing the necessary sensor-specific calibration data such as the sensitivity S of the radiation sensor, the emissivity $\epsilon$ and the transmissivity t of the radiation incidence window W as well as measuring-signal differentials $\Delta U$ as a function of certain predefined window temperatures $T_w$. Alternatively, the calibration data may comprise the corresponding Planck's radiation integrals $L(T_w)$.

According to the invention the measuring electronics unit also encompasses an analytical system for determining measuring-signal differences $\Delta U$ between incoming measuring signals so as to establish the slope of the measured signal curve and to evaluate these measuring-signal differences $\Delta U$ and the said slope with reference to the stored calibration data. The analytical system also serves to generate a malfunction signal in the event of a detected malfunction of the radiation measuring apparatus, which can be flagged by the display device in suitable fashion, for instance in the form of an unmistakable red light signal. Where appropriate, the analytical system may also serve to generate a compensation or correction signal used to compensate for the detected malfunction and to correct for changes in the sensitivity S of the radiation sensor as well as of the measuring signals or measured values received.

For the innovative functional test of the infrared thermometer described, the measuring tip 10 of the latter is switched on and the electric heating of the radiation incidence window W is activated. Next, at a first temperature $T_{w1}$ of the radiation incidence window W that may also be identical to the ambient temperature $T_a$, the temperature $T_b$ of any given test object is measured. Shortly thereafter, at a second, higher temperature $T_{w2}$ of the radiation incidence window W, the temperature $T_b$ of that test object is measured again. The time between the two measurements is kept short enough to allow with sufficient accuracy for the premise of a constant object temperature $T_b$ and a constant ambient temperature $T_a$ during the two measuring processes.

The analytical system described above will now determine the difference between the two measured object temperatures $T_b$ or, alternatively, the difference between the two measuring signals concerned and compare it with the acceptable value or permissible range stored in the measuring electronics and established in the calibration process, allowing for certain acceptable tolerance or error limits which still ensure the proper functioning of the measuring tip 10.

In the event the degree of the measured temperature or signal difference exceeds the acceptable value or permissible range, the analytical system will generate a corresponding malfunction signal indicating to the user, via the display device, an unacceptably strong contamination of the disposable protective cap 18 or of the radiation incidence window W. In addition, for the sake of functional reliability, the display device may provide a suitable reminder suggesting that the unit be cleaned.

To remedy the detected malfunction the user will then inspect the disposable protective cap 18 and clean it thoroughly or—even simpler—replace it with a fresh, clean disposable cap 18. For good measure, he/she will also inspect the radiation incidence window W and will clean it thoroughly if and as needed.

Following the above procedure and before measuring the temperature in the ear of a user, another functional test of the measuring tip 10 should be performed as described further above in order to ensure reliable operation and accurate measuring results.

If, on the other hand, the degree of the measured temperature or signal difference is less than the predefined acceptable value or permissible range, the analytical system will generate a corresponding malfunction signal advising the user, via the display device, of a possible calibration error. Where applicable, the display device may even signal to the user the necessary remedial measures or provide pointers on how to correct the detected malfunction.

To correct the malfunction concerned the user will first inspect the disposable protective cap 18 and clean it as necessary or again simply replace it with a fresh, clean disposable cap 18. For good measure, he/she will also inspect the radiation incidence window W and will clean it thoroughly if and as needed. This will reliably preclude any possible contamination effect from corrupting the sensor signals so that the subsequent use can ensue on the sufficiently accurate assumption of unchanged values for $\epsilon$ and t according to the stored, original calibration data.

Next, in the manner described above, the infrared radiation thermometer is subjected to another functional test with a renewed determination of the temperature or signal difference in two successive measurements of the object temperature $T_b$ and a comparison of that difference with the predefined acceptable value or permissible range. Given the preceding cleaning process, any newly detected deviation from that acceptable value or permissible range can only be attributed to a change in the sensitivity S of the radiation sensor.

Based on the measured deviation, the sensitivity S can be corrected automatically. In fact, the deviation may be used to generate a corresponding correction or malfunction-compensation signal for the subsequent performance of a temperature measurement. The infrared radiation thermometer can thus calibrate itself automatically before each measurement, automatically eliminating the effect any contamination, aging process or defective sensor element in the beam path might have on the measuring results.

Where applicable, the system might advise the user to recalibrate the infrared radiation thermometer.

Instead of a one-time functional test of the infrared radiation thermometer it is possible to monitor its functional performance in continuous or quasi-continuous fashion. In that case it will be desirable to use a radiation incidence window—or any other heated optical element in the beam path—with the shortest possible thermal time constant as in the case of the thin silicon-disk window W here described.

In this case, as the radiation incidence window W is heated up, the sensor signal U is measured in continuous or quasi-continuous fashion and the resulting upslope of the sensor signal U is determined as a function of the window temperature $T_w$. In the manner described above, the slope can be determined simply on the basis of the difference between two measuring signals. Alternatively, if a higher degree of precision is required, correspondingly more accurate numerical processes may be employed in which a larger number of data points are evaluated.

The slope is then compared with the original slope determined during the calibration as described above.

Figure 2:
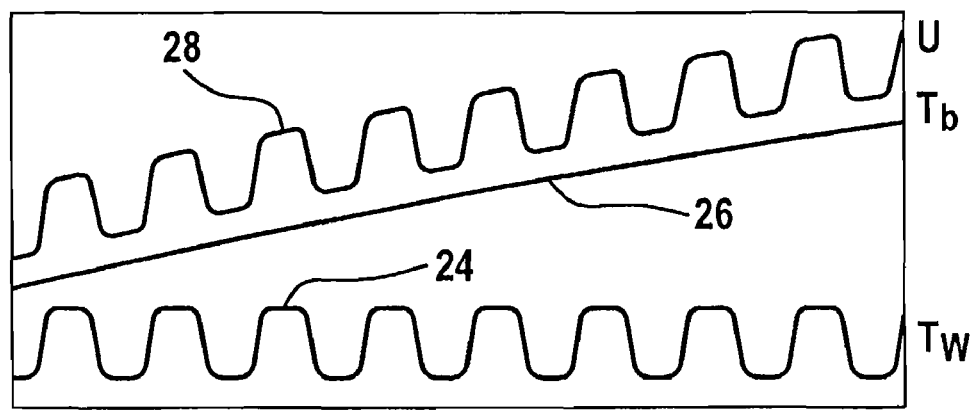
FIG. 2 shows examples of temperature gradients in a continuous functional test of the radiation thermometer per FIG. 1.

For this type of continuous or quasi-continuous functional testing of the infrared radiation thermometer it is also possible to periodically vary the temperature $T_w$ of the radiation incidence window W within specific temperature limits. An example of a periodic variation of the window temperature $T_w$ is illustrated in the bottom-most curve 24 in FIG. 2. The mean curve 26 represents an example of the temporal progression of the temperature $T_b$ of a given test object while the uppermost curve 28 depicts the corresponding periodically varied measured sensor signal U obtained as a result from which, in the manner described above, the desired information on the proper functioning of the infrared radiation thermometer can be derived, permitting continuous functional monitoring. By means of a suitable process such as a lock-in process it is also possible to derive from the measured sensor signal U for instance the temperature $T_b$ of the test object such as the auditory-canal temperature of a thermometer user. The continuous or quasi-continuous functional test can even be performed during a given measuring process for determining the temperature in the auditory canal.

The above describes one example of an infrared radiation thermometer. It should be noted that the method according to the invention can be correspondingly employed for the functional testing of other radiation measuring equipment configured according to the invention, such as IR cameras.

The invention claimed is:

1. A method for testing the proper functioning of a radiation measuring apparatus incorporating a heatable or coolable radiation incidence window (W): comprising the following steps:

collecting a measuring signal (U) representing the temperature ($T_b$) of a test object at a minimum of two different temperatures ($Tw_1$) and ($Tw_2$) of the radiation incidence window (W);

determining a measuring-signal difference ($\Delta U$) as a function of the minimum of two different temperatures ($Tw_1$) and ($Tw_2$); and signaling a malfunction in the event the said measuring-signal difference ($\Delta U$) deviates from a predefined acceptable value or exceeds a predefined permissible range.

2. The method as in claim 1, further comprising the following step: from the said measuring-signal difference ($\Delta U$), the nature of the existing malfunction is automatically identified and displayed.

3. The method as in claim 1 further comprising the following step: the malfunction is automatically rectified or an indication on how to rectify it is displayed.

4. The method as in claim 1, further comprising the following step: the malfunction is rectified through an automatic recalibration of the radiation measuring apparatus.

5. The method as in claim 1, further comprising the following step: the temperature ($T_w$) of the radiation incidence window (W) is periodically varied.

6. The method as in claim 1, further comprising the following steps:
cleaning the radiation incidence window (W); and
retesting the functioning of the radiation measuring apparatus in accordance with claim 1 in the event the degree of the measuring-signal difference ($\Delta U$) exceeds the acceptable value or permissible range.

7. The method as in claim 1, further comprising the following steps:
cleaning the radiation incidence window (W);
repeating the collecting and determining steps; and
automatically generating a correction or compensation signal in the event the degree of the measuring-signal difference ($\Delta U$) falls below the acceptable value or permissible range.

8. The method as in claim 1, wherein the radiation measuring apparatus is a radiation type thermometer.

9. A radiation measuring apparatus such as a radiation thermometer, comprising:
a radiation incidence window (W);
a heating or cooling device for the radiation incidence window (W) operable to set the radiation incidence window (W) to at least two different temperatures ($Tw_1$) and ($Tw_2$);
at least one temperature-sensitive sensor element (22) serving to convert electromagnetic radiation into electric measuring signals (U);
a measuring electronics unit serving to capture and evaluate the measuring signals (U) and to store calibration data; and
a display device;
wherein the measuring electronics unit comprises an analytical system for the analysis of a measuring-signal difference ($\Delta U$) based on measuring signals (U) corresponding to the at least two different temperatures ($Tw_1$) and ($Tw_2$) of the radiation incidence window (W) and for generating a malfunction signal if the measuring-signal difference ($\Delta U$) deviates from a predefined acceptable value or exceeds a predefined permissible range.

10. The radiation measuring apparatus as in claim 9, wherein the malfunction signal includes a compensation or correction signal.

11. The radiation measuring apparatus as in claim 9, wherein the heating or cooling device is optionally periodically activated.

12. The radiation measuring apparatus as in claim 9, wherein the heating or cooling device is integrated into the radiation incidence window (W).

13. The radiation measuring apparatus as in claim 9, wherein the radiation incidence window (W) comprises a temperature probe.

14. The radiation measuring apparatus as in claim 9 wherein the radiation incidence window (W) comprises silicon.

\* \* \* \* \*